United States Patent
Youman et al.

(10) Patent No.: US 6,865,872 B2
(45) Date of Patent: Mar. 15, 2005

(54) OVER-THE-ROW SINGLE SIDED HARVESTER

(75) Inventors: Marty D. Youman, Madera, CA (US); Kevin M. Caine, Fresno, CA (US); Franklin P. Orlando, Morgan Hill, CA (US)

(73) Assignee: AG-Right Enterprises, Madera, CA (US)

( * ) Notice: Subject to any disclaimer, the term of this patent is extended or adjusted under 35 U.S.C. 154(b) by 0 days.

(21) Appl. No.: 10/151,680

(22) Filed: May 16, 2002

(65) Prior Publication Data

US 2003/0213221 A1 Nov. 20, 2003

(51) Int. Cl.[7] ............................................. A01D 46/00
(52) U.S. Cl. ........................................................ 56/328.1
(58) Field of Search .............................. 56/325.1, 327, 56/330, 331, 340.1

(56) References Cited

U.S. PATENT DOCUMENTS

| | | | |
|---|---|---|---|
| 3,325,984 A | * 6/1967 | Christie et al. | 56/330 |
| 3,344,591 A | 10/1967 | Christie et al. | 56/330 |
| 3,385,042 A | * 5/1968 | Christie et al. | 56/330 |
| 3,413,789 A | 12/1968 | Studer | 56/330 |
| 3,494,117 A | 2/1970 | Weygandt et al. | 56/330 |
| 3,590,566 A | * 7/1971 | Cutts et al. | 56/330 |
| 3,926,663 A | 12/1975 | Gray | 134/6 |
| 3,966,344 A | 6/1976 | Haker et al. | 404/117 |
| 3,972,381 A | 8/1976 | Gail | 180/401 |
| 3,979,891 A | 9/1976 | Patton | 56/328.1 |
| 4,007,053 A | 2/1977 | Gray | 134/6 |
| 4,031,695 A | * 6/1977 | Diggs | 56/237 |
| 4,077,193 A | 3/1978 | Diggs | 56/328.1 |
| 4,286,426 A | 9/1981 | Orlando et al. | 56/330 |
| 4,329,836 A | 5/1982 | Scudder | 56/330 |
| 4,341,062 A | 7/1982 | Scudder | 56/330 |

(List continued on next page.)

FOREIGN PATENT DOCUMENTS

| | | | |
|---|---|---|---|
| GB | 1390495 | * | 4/1975 |
| GB | 2053641 A | * | 2/1981 |
| GB | 2063634 A | * | 6/1981 |
| GB | 2281493 | * | 3/1995 |

Primary Examiner—Thomas B. Will
Assistant Examiner—Nathan Mammen
(74) Attorney, Agent, or Firm—Law Offices of Douglas W. Rudy, LLC; Douglas W. Rudy

(57) ABSTRACT

A over-the-row single sided harvester harvests a row crop from a first side of a row while simultaneously collecting crop from the "off side" side of the same row.

16 Claims, 7 Drawing Sheets

U.S. PATENT DOCUMENTS

| | | | |
|---|---|---|---|
| 4,418,780 A | 12/1983 | Ito et al. | 180/142.2 |
| 4,432,190 A | 2/1984 | Orlando et al. | 56/1 |
| 4,586,724 A * | 5/1986 | Sargent et al. | 280/412 |
| 4,621,488 A | 11/1986 | Claxton | 56/330 |
| 4,860,529 A | 8/1989 | Peterson et al. | 56/330 |
| 4,974,405 A | 12/1990 | Littau | 56/330 |
| 4,976,094 A * | 12/1990 | Williamson et al. | 56/330 |
| 5,067,314 A | 11/1991 | Burke | 56/330 |
| 5,074,108 A | 12/1991 | Claxton et al. | 56/330 |
| 5,092,113 A * | 3/1992 | Turunen | 56/330 |
| 5,113,644 A | 5/1992 | Windemuller et al. | 56/330 |
| 5,207,277 A * | 5/1993 | Medlock | 171/38 |
| 5,259,177 A | 11/1993 | Windemuller et al. | 56/330 |
| 5,265,898 A * | 11/1993 | Houck | 280/413 |
| 5,307,611 A | 5/1994 | Vardeman et al. | 56/10.2 |
| 5,329,661 A * | 7/1994 | Smith | 15/80 |
| 5,339,612 A | 8/1994 | Scott | 56/330 |
| 5,341,630 A * | 8/1994 | Littau | 56/330 |
| 5,355,667 A | 10/1994 | Scott | 56/330 |
| 5,423,166 A | 6/1995 | Scott | 56/330 |
| 5,661,963 A | 9/1997 | Scott | 56/328.1 |
| 5,813,910 A | 9/1998 | Meester et al. | 460/113 |
| 5,904,034 A | 5/1999 | Youman | 56/328.1 |
| 5,908,352 A | 6/1999 | Meester et al. | 460/113 |
| 5,996,722 A | 12/1999 | Price | 180/403 |
| 6,070,402 A * | 6/2000 | Korthuis et al. | 56/330 |
| 6,178,730 B1 | 1/2001 | Visser | 56/340.1 |
| 6,360,518 B1 | 3/2002 | Scott et al. | 56/328.1 |
| 6,421,995 B1 * | 7/2002 | Sancho | 56/340.1 |
| 6,484,810 B1 * | 11/2002 | Bendix et al. | 171/31 |
| 6,517,097 B1 * | 2/2003 | Stark | 280/442 |

* cited by examiner

OVER-THE-ROW SINGLE SIDED HARVESTER

BACKGROUND OF THE INVENTION

This invention has to do with fruit harvesters of the type used in harvesting olives, fruit, grapes and other mechanically harvested products that grow above ground. Mechanical harvesters of the general type disclosed herein are known to be large over the crop, over-the-row, devices that are most generally self-propelled.

The invention presented herein is a harvester that has a provision for harvesting from one side of a crop row while simultaneously including the collection of crop from the "off-side" side of the row.

There are several types of mechanized harvester in the field of harvesters that this invention pertains. One type of harvester is an over-the-row ("OTR") harvester. This is generally a very large, self-propelled, harvester. It has significant height and a massive frame. The height is necessary to clear the tops of fruit trees, olive trees, and the like. The massive frame is necessary to provide structure to support drive axles, the prime mover of the harvester, the picking heads, of which there are usually at least two—at least one on each side of the harvester, and the crop transport system. A massive structural frame is necessary to support the propulsion and steering systems and the picking heads. Another reason that the frames are massive is that over-the-row harvesters don't have transverse axles between the left side and the right side wheels thus a significant structure is needed to support equipment on both sides of the harvester. The over-the-row harvester has to straddle the row being harvested to avoid contact with the trunk of the tree, the vines and the vine supports and the like comprising the row.

A conventional over-the-row harvester harvests both sides of the row thus mandating that fruit is collected from both sides of the tree or row of product, resulting in a high volume of harvested product. The harvester has to have enough picking units to harvest the entire tree, for instance, an olive tree, in a single pass. This leads to the need for complex drive systems. Often the picking heads are hydraulically operated and the operation system of a picking head contains several subsystems. Another component of the drive system is the hydraulic drive for driving the vehicle's wheels. A second hydraulic system is needed to steer the driving wheels, a significantly complex system in the case of the typical four-wheel drive system. Another complex hydraulic system on the over-the-row harvester is the system to provide suspension and leveling functions. The over-the-row harvester needs to be large enough to accommodate the volume of harvested product harvested from both sides of the row. This adds to the cost and complexity of the over-the-row harvester.

The over-the-row olive and fruit tree harvesters are high cost harvesters with associated significant maintenance costs due to the complexity of the systems involved in the harvester.

Another type of mechanized harvester in use today is known as a down-the-row single-sided harvester ("DTRSS"). The DTRSS is essentially a single sided over-the-row harvester and shares some of the complexities of the OTR harvesters. A down-the-row single-sided harvester costs about sixty percent of the cost of an over-the-row harvester but the efficiency of the DTRSS harvester is less than half of the efficiency of the OTR harvester. Despite that DTRSS harvesters are smaller, lighter and more agile than OTR harvesters they suffer the drawback of not being able to collect the portion of the crop that is shaken from the tree or vine and lands on the "off-side" of the row. This is a big disadvantage of the DTRSS harvester. This disadvantage is overcome with the invention herein disclosed. A second disadvantage of the DTRSS harvester, as is also a disadvantage with the over-the-row harvesters, is the high maintenance required in support of the drive systems used in the down-the-row single-sided harvester.

The harvester invention presented herein overcomes the disadvantages of both the over-the-row and of the down-the-row single-sided harvesters by providing a light weight but structurally sound towable harvester that is inexpensive, compact, efficient in that it collects crop from both sides of the harvested tree or vine even when operating from only one side of the row.

SUMMARY OF THE INVENTION

An over-the-row single-sided harvester that is towable behind a tractor is provided. It includes a frame that enables it to straddle a crop row, such as rows of vines in vineyards, berry plants planted in rows, or row of trees, such as olive trees or fruit trees. The planted rows of trees or vines will have a first side of the row, for convenience this is a reference to the first side of the row being harvested, and a second side of the row, the side not being directly harvested during a particular harvesting pass. Normally two passes of the harvester will be made to harvest a row—one pass on the first side of the crop row and one pass on the second side of the crop row. After a harvesting pass the second side of the crop row then becomes the first side, i.e., the side that is actually in direct contact with the vibratory brush of the harvester. The frame or chassis of the down-the-row single-sided harvester presented herein carries at least one harvesting tree shaking device located on a first side of the harvester and significantly includes a crop collection system that will gather crop on the shaker or brush side of the harvester as well as on the "off-side" of the harvester.

The over-the-row single-sided harvester is a towable, nonpowered vehicle designed to be towed behind a tractor and to receive its vibratory shaker brush drive force from the tow vehicle. The result is an inexpensive, low maintenance harvester having a low purchase price while being very efficient in collecting the crop shaken from the tree or vine as collection is made on both sides of the tree or crop row. Although the preferred embodiment is a non-powered device, it is contemplated that the over-the-row single-sided harvester presented herein can be a powered harvester if desired.

It is an object of this invention to provide a harvester that harvests a crop from one side of the crop row or tree being harvested while at the same time collecting crop from the "off-side" of the crop row so that high crop harvesting yield is realized without losses from failure to collect crop from the "off-side" of the harvested row.

It is another object of the invention to provide a crop harvester having low initial cost. The cost of automated harvesting equipment is high and only the largest corporate farms, orchards and vineyards can afford the largest, most sophisticated and sometimes more efficient harvesting equipment.

It is another object of this invention to provide a mechanized harvester of the type that can be used to harvest fruit from trees and vines that is inexpensive to maintain, easy to repair and robust and sturdy in construction to facilitate a low maintenance harvesting device.

Another object of the invention is to provide a mechanized harvester that is compatible with the crop, that is to say that the harvester will not damage the crop during the harvesting operation.

It is also an object of this invention to distribute a significant amount of the weight and/or mass of the harvester to one lateral plane of the harvester. This lateral plane will be a plane in which the picking head of the harvester is located.

Also an object of the invention is to provide a harvester that is capable of catching the entire product or harvested crop. Losses due to crop dropped in the harvesting process decreases the output of the field and erodes the profit garnered by the grower.

One more object of the invention is that with mechanized harvesting a crop can be brought in or harvested at the peak of crop maturity relative to the best time for marketing or processing. The crop is delivered in the best possible condition to the grower's buyer, processing plant or downstream operation.

Another object of this invention it to leave the harvested trees in the best possible condition for good cropping in future seasons. That is, the mechanized equipment will not damage the trees or the vines as the harvester removes the fruit, nuts, or other crop from the tree.

It is also an object of the invention to provide a harvester that is more maneuverable on wet ground than a standard over-the-row harvester.

The preferred embodiments of the invention presented here are described below in the drawing figures and Detailed Description of the Drawings. Unless specifically noted, it is intended that the words and phrases in the specification and the claims be given the ordinary and accustomed meaning to those of ordinary skill in the applicable arts. If any other special meaning is intended for any word or phrase, the specification will clearly state and define the special meaning.

Likewise, the use of the words "function" or "means" in the Detailed Description of the Drawings is not intended to indicate a desire to invoke the special provisions of 35 U.S.C. 112, Paragraph 6, to define the invention. To the contrary, if the provisions of 35 U.S.C. 112, Paragraph 6 are sought to be invoked to define the inventions, the claims will specifically state the phrases "means for" or "step for" and a function, without also reciting in such phrases any structure, material or act in support of the function. Even when the claims recite a "means for" or "step for" performing a function, if they also recite any structure, material or acts in support of that means or step, then the intention is not to invoke the provisions of 35 U.S.C. 112, Paragraph 6. Moreover, even if the provisions of 35 U.S.C. 112, Paragraph 6 are invoked to define the inventions, it is intended that the inventions not be limited only to the specific structure, material or acts that are described in the preferred embodiments, but in addition, include any and all structures, materials or acts that perform the claimed function, along with any and all known or later-developed equivalent structures, material or acts for performing the claimed invention.

BRIEF DESCRIPTION OF THE DRAWING FIGURES

DETAILED DESCRIPTION OF THE INVENTION

Figure 1:
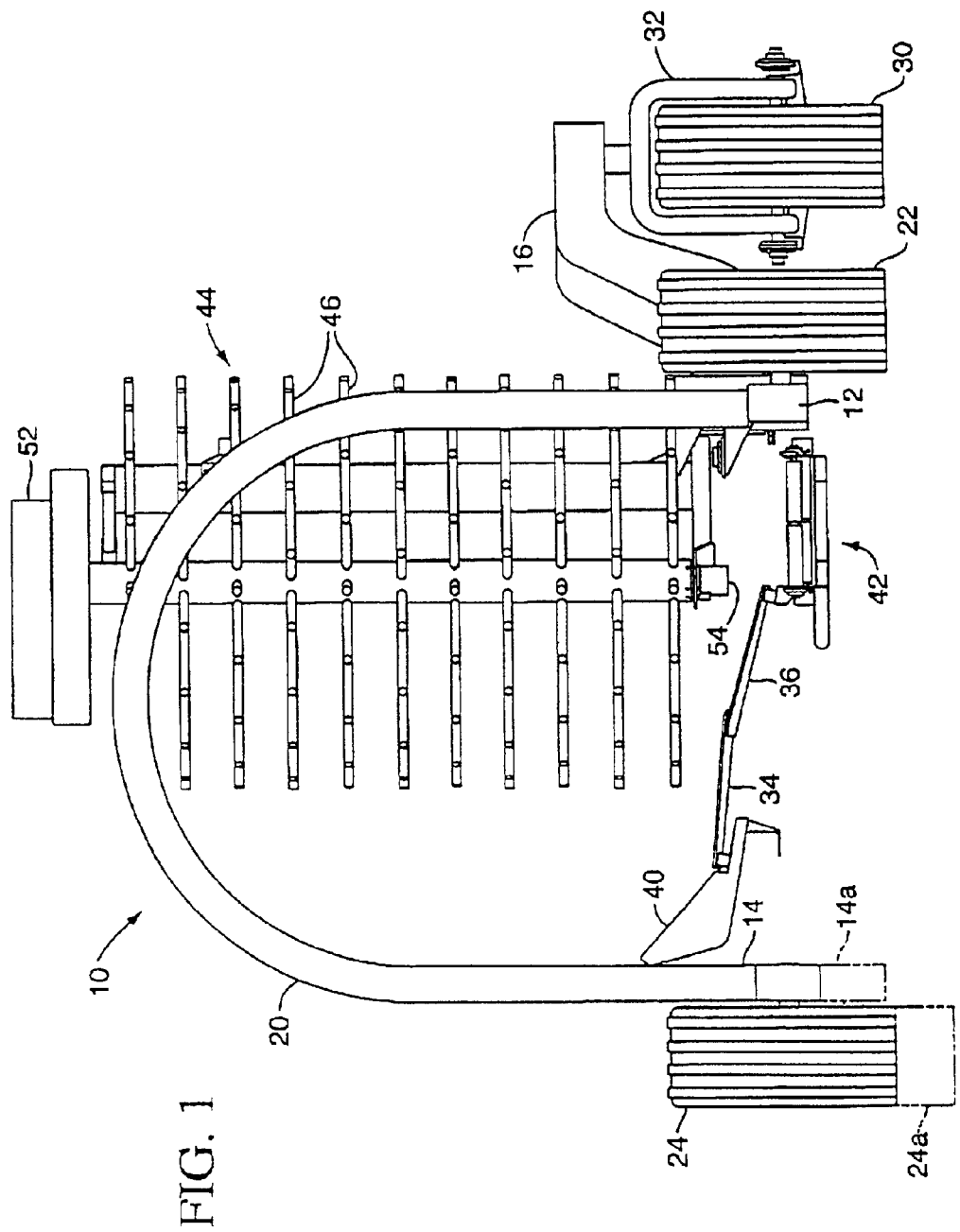
FIG. 1 is a pictorial representation of an over-the-row single-sided harvester looking from the back of the harvester to the front of the harvester.

Turning first to FIG. 1 wherein an end view of the over-the-row single-sided harvester, generally 10, is shown from the relative back end of the unit. The frame or chassis of the unit is constructed of two frame rails, the first being the major frame rail or main frame member 12 that is the structural backbone of the chassis. A vertical plane from this main frame rail provides a target zone for carrying the bulk of the weight of the harvester. A second frame rail, an "off hand," "off-side" or outboard frame rail 14 is positioned parallel to the first frame rail 12. Prominently discernable in this figure is a double pivoting draw bar link 16 pivotally attached to the forward or leading end of the first frame rail or main frame member 12. The main frame member also has a trailing end portion. The first frame rail is connected to and supports at least one over-the-row frame hoop, here shown as a rearmost hoop 20. This frame member is a hoop-like structure of sufficient height to clear a crop or row of trees passing between the frame rails 12 and 14 as the harvester is pulled along a row being harvested or otherwise being treated or acted upon by the harvester. The frame hoop provides a wheel mounting location as described below. Normally two hoop frames will be incorporated in the tow behind or pull behind harvester presented herein.

The main frame member 12 is located such that it is adjacent a first side of the tree or the vine to be harvested. After the first side is harvested the harvester may be pulled along the unharvested side of the tree or vine row and that side now being harvested becomes, for conformation in this disclosure, the first side of the vine row as explained above.

The inventor contemplates that the harvester will be equipped with three support wheels in a preferred embodiment of the invention. The rear wheel 22 on the main frame side of the harvester is generally juxtaposed opposite the wheel 24 on the off-hand side of the harvester. This off-hand side wheel is elevatable and generally movable upwardly and downwardly, as would be other wheels on the off-hand side frame rails in other embodiments of the invention using more than one wheel on the off-hand side of the harvester. The elevatable wheel allows leveling of the harvester and to the extent desired, a degree of vertical displacement of the harvester brush, generally 26. The scope of the elevatable wheel is depicted by dotted line positions of the frame 14a and the wheel 24a.

A third wheel, a draw bar link support wheel 30, is supported through an axle on a pivotable clevis-like support 32, which is pivotally mounted to the double pivotable draw bar link 16.

In a preferred embodiment none of the three wheels of the simplest and preferred embodiment are driven wheels. However driving one or more of the wheels may have advantages such as traction enhancement, turning and maneuverability enhancements and even minimal propulsion capability if the harvester is hydraulically, electrically or mechanically connected to a source of power. It is also contemplated that the features of the harvester can be incorporated into a self-propelled harvester that has a harvesting head on one side of the harvester and provisions for collecting crop from the "off-side" of the harvester while harvesting.

Schematically or pictorially represented and shown in FIG. 1 is an end view of the crop transporting system including an outboard side (relative to the harvester brush) crop transporting platform or conveyor component 34 and an inboard side crop transporting platform or conveyor component 36. A crop slide 40, generally a fixed structure, is located inboard of the frame rail and hoop frame to deliver crop to the conveyor system 34. The crop slide and the outboard side crop transporting platform give the harvester the ability to collect crop from the "off-side" of the harvester as it is harvesting crop from a first side of the crop row. A belt conveyor or other style of conveyor, generally 42, receives harvested crop from the crop transporting system components 40, 34 and 36 and will convey the harvested crop to a transport or storage bin or another crop handling system for clearing the crop from the harvester as it is pulled or otherwise moved along the row in a harvesting mode.

The harvesting, or the removal of the crop from the host vegetation, be that a row of olive trees, row of fruit trees in an orchard, a row of grape vines in a vineyard, is accomplished using, in the preferred embodiment presented here, a vibratory brush, generally 44, having vibratory tines such as 46, supported on and extending from a central support shaft 50. The vibration for vibrating the tines is provided by a vibratory drive such as a force balanced drive 52. Vibratory drives and vibratory harvesting brush technology is known in the art. In this embodiment the vibratory brush 44 is supported for rotational movement on a bearing surface and support arm 54. The support arm 54 is fixedly attached to the lower end of a vertical support tower that is pivotally carried on the main frame rail 12. Positioning the harvester brush and its support on the main frame rail, generally in the aforementioned vertical plane, helps distribute the weight and mass of the harvester on the picking side of the harvester.

The main frame rail 12 also carries the double pivotable draw bar link. It is pivotally connected to the frame rail 12, generally toward the leading end thereof, in a manner that allows the double pivoting draw bar link to be pivoted from an outward deployment as seen in FIG. 1 to an inboard deployment as will be shown in other figures.

Figure 2:
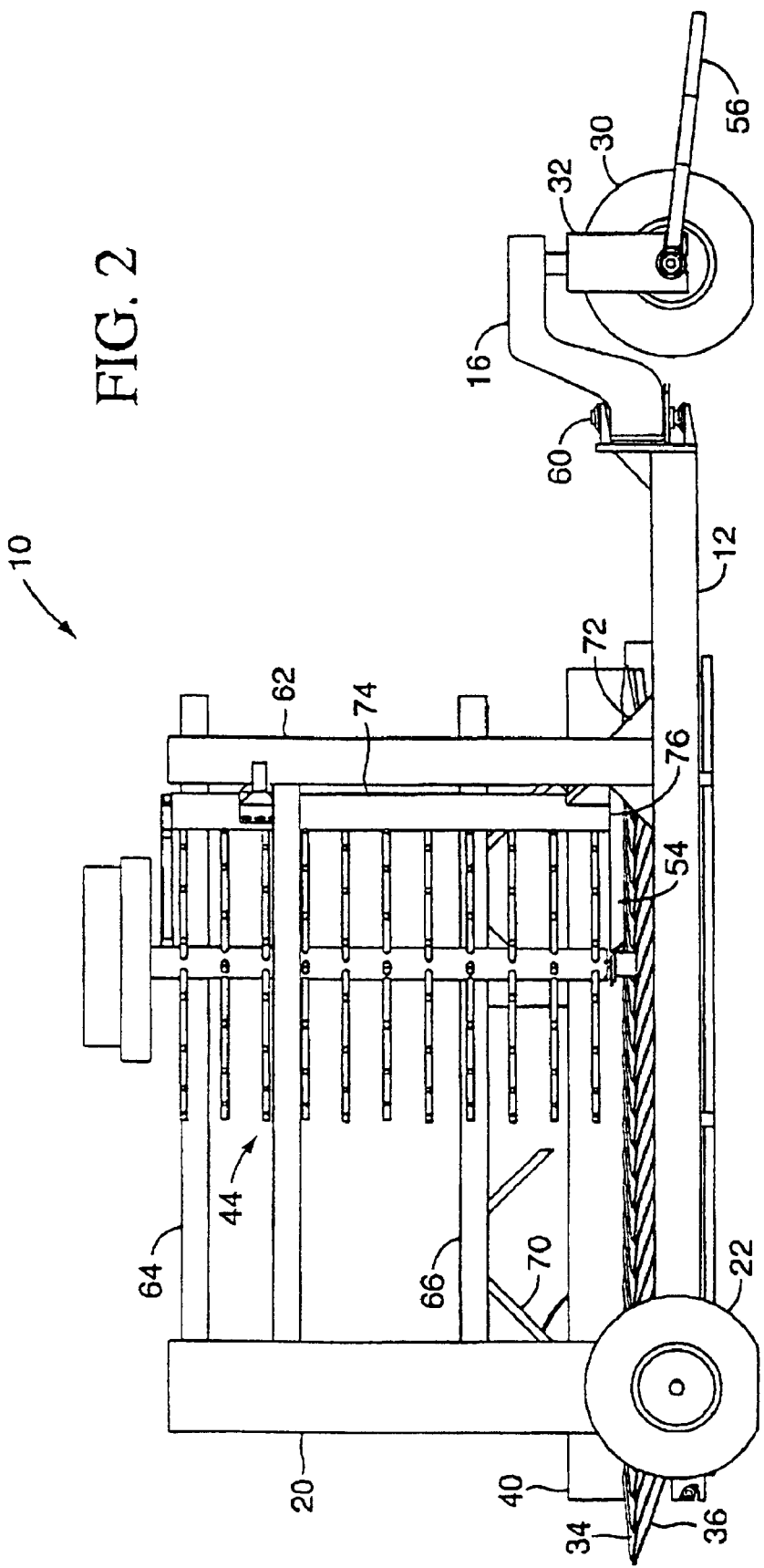
FIG. 2 is a side elevation view of a simplified pictorial representation of the harvester shown in FIG. 1.

A side elevation of the FIG. 1 preferred embodiment, looking from the main frame rail side of the harvester, is shown in FIG. 2. Visible in this view is a hitch link 56 having one end attached to the draw bar support wheel 30 structure such as the pivotable clevis like support 32 or, alternatively, to axle extensions or elements in line with the support wheel's axle. This hitch link will be attached to the grower's tractor, not shown, and the tractor operator will steer the tractor adjacent to and down the crop row to harvest the crop. The double pivotable draw bar link will be pivoted to the outboard or harvesting position as shown in FIG. 1 (rather than the transport position shown in FIG. 2) in the harvesting operation. The draw bar link is pivotally attached at pivot 60 which includes a bearing and flange support system to allow attachment of the pivot to the main frame rail 12.

In this FIG. 2 view the rear hoop frame 20 is shown in side elevation. A second or front frame hoop 62 is shown attached at one end thereof to the main frame member or frame rail. The second frame hoop 62 is also attached to the off-side frame member in a manner as used in attaching the rear frame hoop. The second frame hoop has a second end that is attached to a beam running to and attached to the first frame hoop. An upper beam 64 structurally ties the front frame hoop to the rear frame hoop. A side beam 66 may be used to tie the front hoop to the back hoop. Structural diagonals, such as 70, enhance the structure of the harvester as do gussets 70.

The vibratory brush, generally 44, is shown supported on support arm 54. In the preferred embodiment shown there is one vibratory brush however the inventors contemplate that more than one vibratory brush can be mounted. Two or more brushes can be stacked vertically, aligned one above the other, or they can be mounted at different axial angles to each other. Alternatively, multiple brushes can be set laterally adjacent each other in the same or different planes. Returning to the preferred embodiment, the support arm 54 is attached to a vertical support tower 74 that is pivotally mounted through a pivot mount 76 to the main frame rail 12. Again, the weight of the harvester brush is concentrated over the main frame rail in the vertical plane. The intermediate portion of the support tower may be attached to the front hoop 62, or other convenient mounting location, through support tower intermediate support 80. A further support may be used at the upper end of the support tower if necessary. A convenient attachment location for such a support, not shown in FIG. 2, would be the upper area of the front frame hoop 62.

Figure 3:
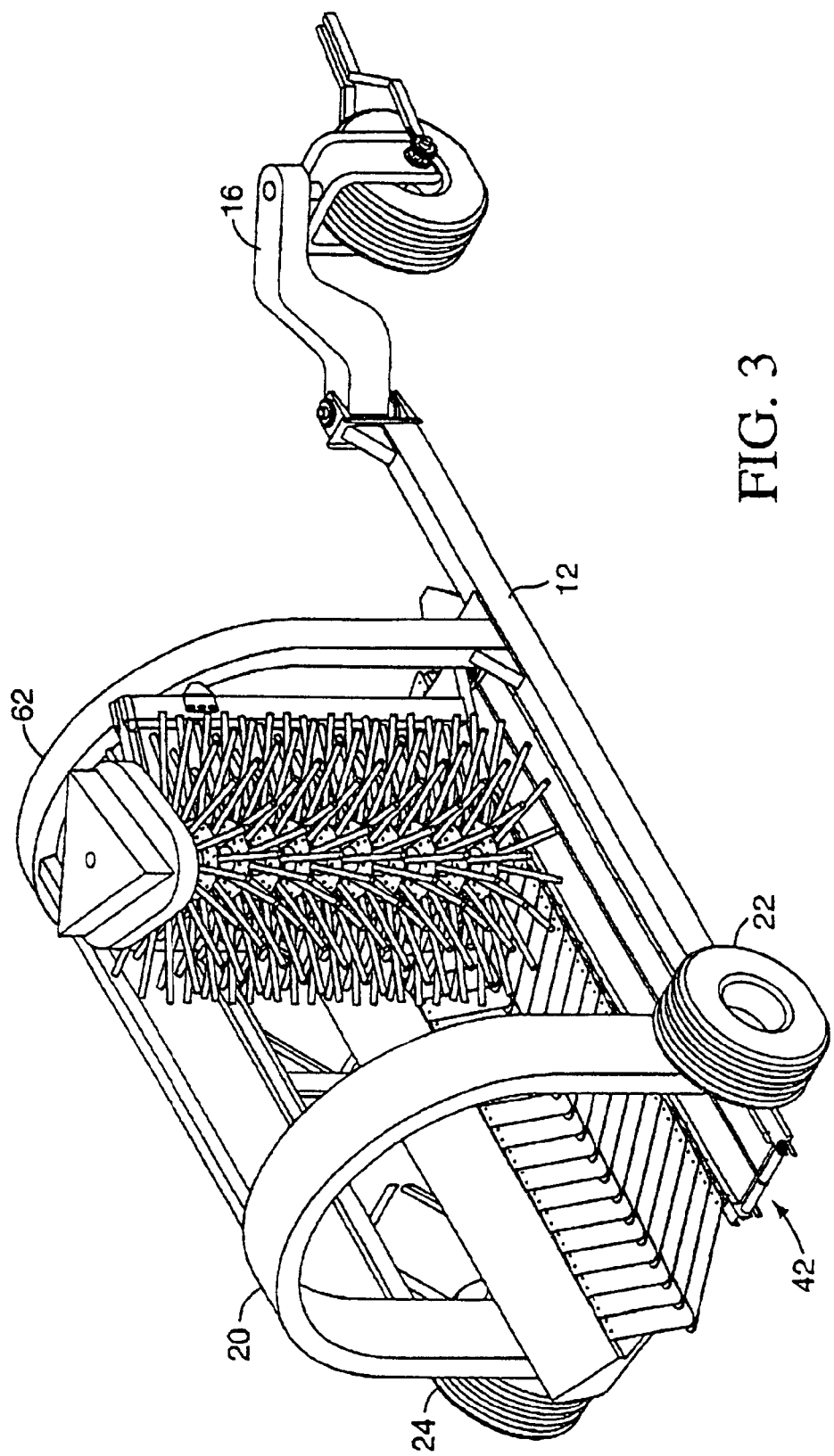
FIG. 3 is a prospective pictorial representation of the harvester FIG. 1 taken from the rear "on-side" position of the harvester.

FIG. 3 is a perspective view of the harvester in FIGS. 1 and 2 having the double pivotable draw bar link 16 deployed outboard and fixed in that location. A retention system for retaining the draw bar link in a fixed position may include a vertical pin. The vertical pin is used to fix the draw bar link in the position shown in the simplest embodiment. The pin would interface between the main frame rail 12 and the draw bar link. Other locking and latching expedients, comprising a retention system, are contemplated, for instance a hydraulic link could be positioned between the draw bar link and the main frame rail to serve to move and lock the draw bar link in either the deployed position show in FIG. 2, a harvesting mode deployment position or in the transport mode deployment or position. Familiar components in this view include the rear wheels, 22 and 24, the frame hoops 20 and 62 and the crop conveyor, generally 42.

A curtain 28, generally a flexible sheet of material such as canvas, synthetic sheet, or in certain embodiments, a sheet of aluminum or other metal, that can be attached to the "off-side" of the harvester to prevent crop that would normally fly free of the harvester to be contained and directed to the collection and conveying system of the harvester. This is an optional element of the harvester but it is expected that it would be fitted for most harvesting operations. The curtain is not shown in the other figures for simplicity, however, it is contemplated that it can be used and installed on any embodiment of the invention presented herein.

Figure 4:
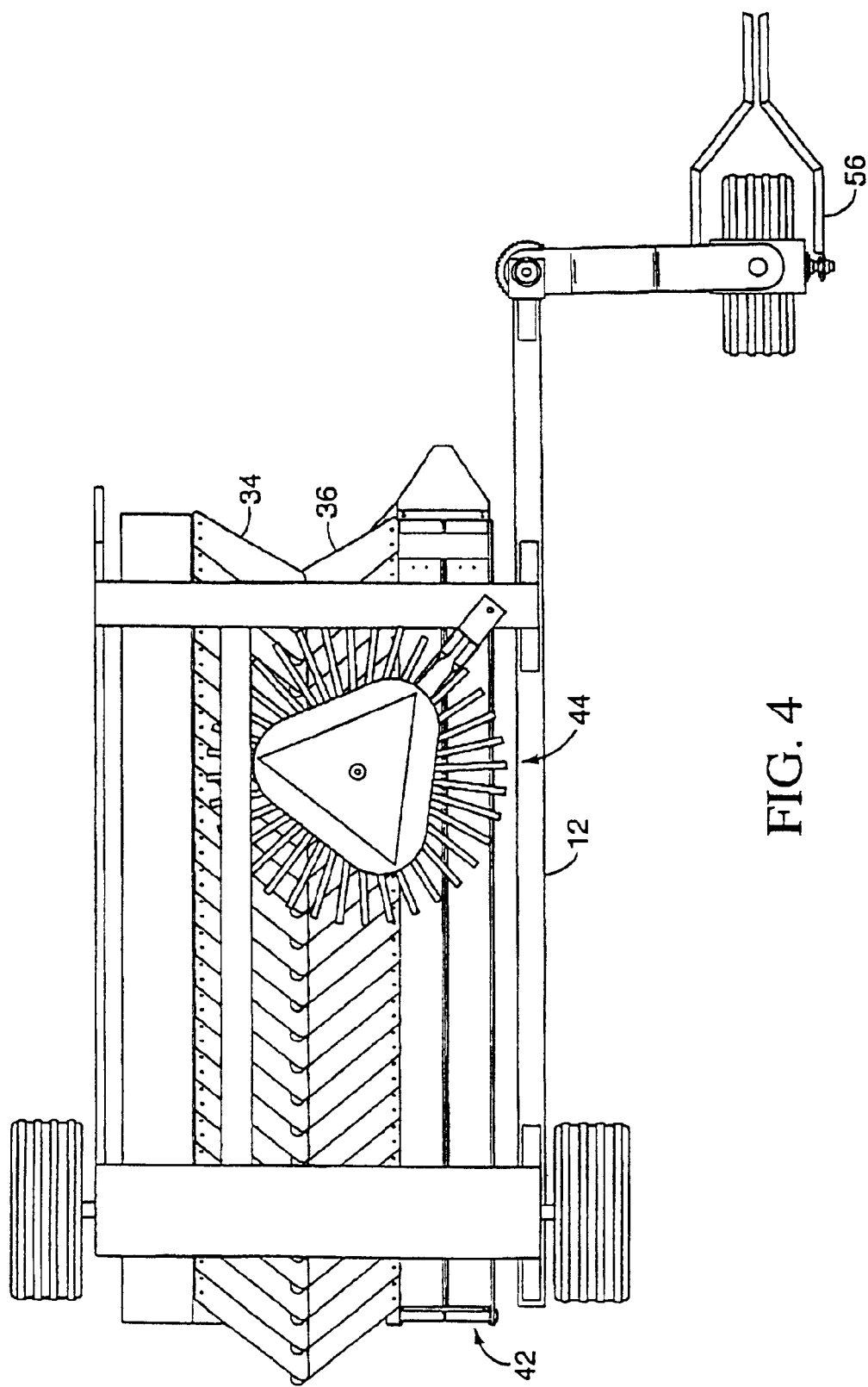
FIG. 4 is a top view of the pictorial representation of the harvester shown in FIG. 3 with a harvesting spokes deployed inwardly as it would be in a harvesting mode.

FIG. 4 is a top view of the harvester shown in FIG. 3 with the vibratory brush, generally 44, pivoted from a first position inwardly to an inboard position to show how the vibratory brush can move on its pivot points on the main frame rail 12. This figure shows the direction of travel of the harvester. It will be pulled by the tractor attached to the hitch link 56 with the tree and vine rows entering a chevron like arrangement of conveyor paddles making up the crop transporting system, 34 and 36, which will, using gravity deliver the crop, such as olives, to the crop take-away conveyor generally 42.

Figure 5:
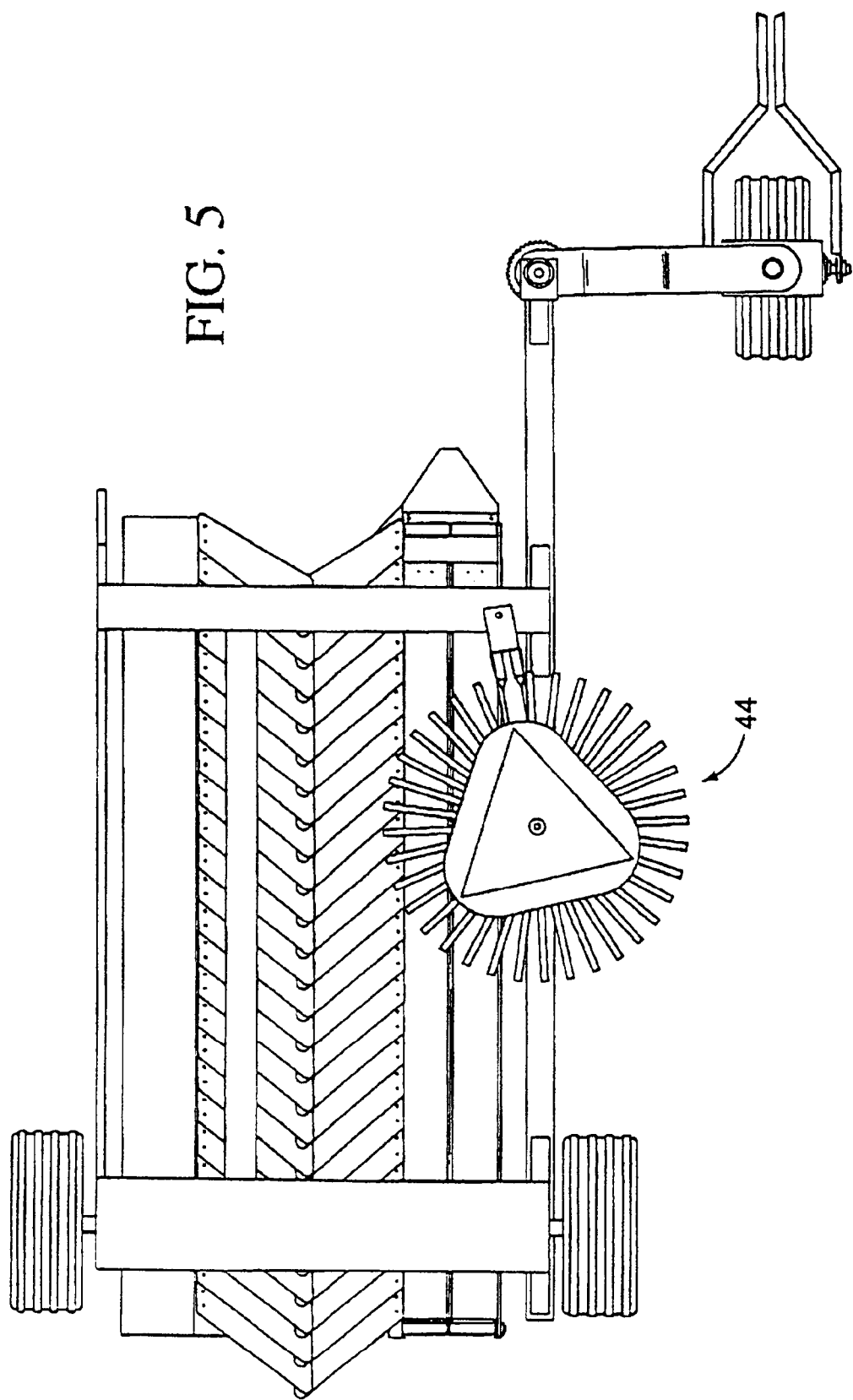
FIG. 5 is similar to FIG. 4 with the harvester spokes deployed in a more outward position.

FIG. 5 is the embodiment of FIG. 4 with the vibratory brush, generally 44 swung to an outboard position as would happen as the girth of the tree being harvested increased as the harvester is pulled past a tree in an orchard. Between FIG. 4 and FIG. 5 the amount of vibratory brush displacement is apparent. In FIG. 4 either a small tree is being harvested, a row of vines in a vineyard is being harvested or the leading peripheral circumference of a large tree is being harvested. The vibratory brush is generally pivoted by a hydraulic cylinder to move inwardly or outwardly depending on the size of the tree or vines. This can be done manually by the tractor operator controlling a hydraulic valve or it can be done automatically. The automatic control of brush position is known. Some systems use feeler rods that contact the circumference of the target tree and move inboard or outboard depending on the sensed size and/or density of the tree.

Figure 6:
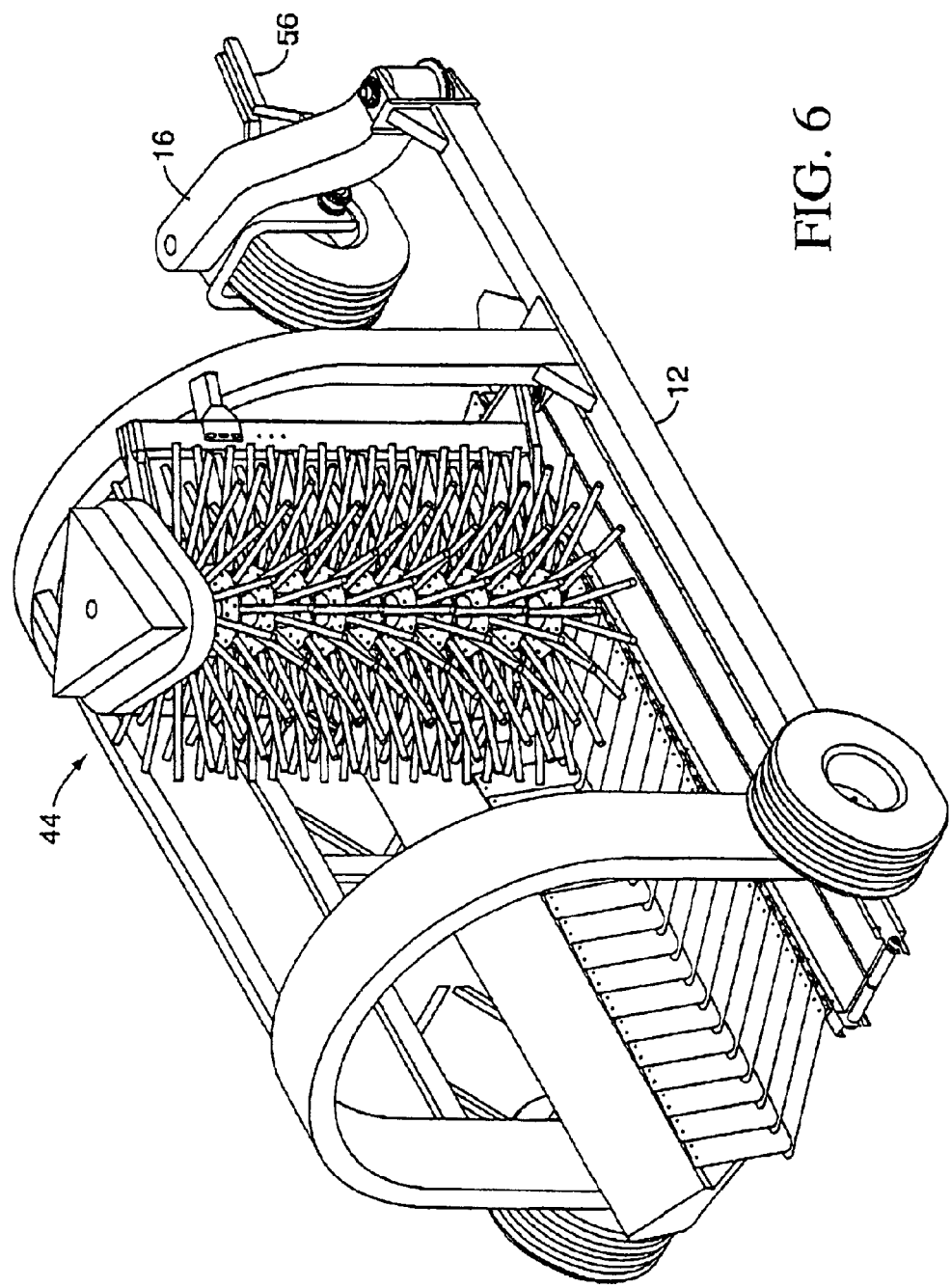
FIG. 6 is a perspective view of the harvester of FIG. 1 with the swinging cantilevered front axle deployed in a transport position.
Figure 7:
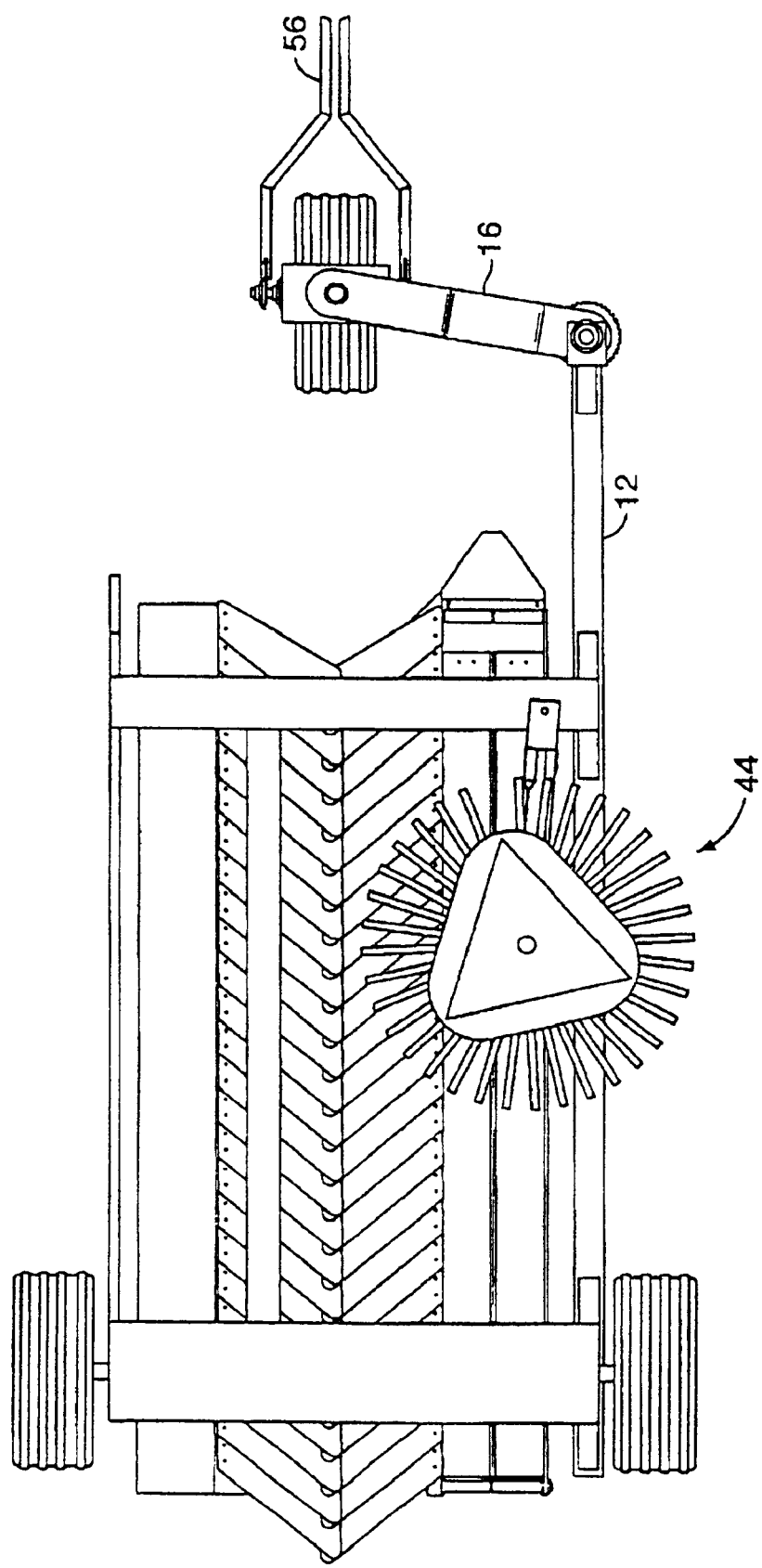
FIG. 7 is a top view of the harvester of FIG. 6.

FIG. 6 and FIG. 7 show the same harvester as in FIGS. 4 and 5 but in these figures the harvester is deployed in a transport mode. The double pivotable drawbar link 16 has been rotated to the inboard location and locked in place by means of the pins latching and locking the drawbar link to the main frame rail 12. The tractor would hook up to the hitch link 56 and be pulled to a storage or other location. This would not be a normal harvesting mode.

The operation of the harvester is simple and straight forward. Assuming the preferred embodiment wherein the harvester is pulled by a tractor and not a self-propelled embodiment, the harvester is hitched up to the host tractor drawbar and pulled to the orchard. During hookup a power-takeoff drive could be connected to drive a hydraulic motor on the harvester. Alternatively, and in a simpler hydraulic connection, the hydraulics of the harvester, pump and control valves, could be plumbed and hooked up directly to a hydraulic fluid input on the tractor. The hydraulic fluid source is used to drive a hydraulic motor to provide rotary motion to, for instance, a force balanced shaker that will impart vibratory action in the vibratory brush of the harvester. The hydraulic source will also be used to control the movement of the vibratory brush inboard and outboard, generally through the use of a hydraulic cylinder. A hydraulic drive motor, or an electric motor in an alternative embodiment, will also be used to rotate the brush to the extent that brush rotation is not inherent in the vibratory drive scheme. Another use of the hydraulic fluid supply is to drive the conveying systems used for transporting the loose crop. The take away belt and the crop transportation system can be hydraulically driven in a preferred embodiment or can be electrically or mechanically driven.

Elevation of the harvester on the off-hand or "off-side" side of the harvester is adjustable. As shown in FIG. 1, the wheel 24 can be moved to position 24a, and any point in the range of motion, to level the harvester as it is being pulled over a row. Leveling the harvester is one goal, however it is also expected that by adjusting the position of the off-side wheel 24 the angle of the vibratory brush could be moved from a vertical displacement to a nonvertical displacement. Generally, the harvester will have the ability to move the vibratory brush in to the tree and out, away from the tree to stay as close to the tree circumference as possible to yield good tree mass shaking without damaging the tree, thus angling of the vibratory brush is not usually needed but the hydraulically actuated raising and lowering of the wheel 24, through a bell crank mechanism, a straight hydraulic cylinder actuator or even a manual crank device or pin stabilized adjustment is contemplated by the inventors.

An alternative embodiment of the crop collection system where the crop is all directed to the main vertical plane side of the harvester as shown in the drawing figures is to have the off-side crop collected on the off-side of the harvester. This could be a static collection tray, a collection system including a take-away convey for directing the off-side crop to a collection bin or to a consolidated storage bin or another arrangement resulting in the collection of crop that normally may be left in the field.

Not shown in the drawing figures in a collection bin in which the harvested crop is intermediately stored or held before off loaded. This could be a transverse conveyor system to a towed bin, a bin on the harvester itself or any other suitable crop collection system known in the harvesting art.

It is possible to drive a portion of the driven components through a mechanical linkage responsive to ground contact however this would not be the preferred method of component drive on the harvester.

In summary the invention presented herein is an over-the-row, single-side harvester for harvesting crop from trees and vines planted in rows. The rows have a first side and a second side. The harvester will be pulled by a tractor along the row of crop. The harvester straddles the trees or vines as it harvests the crop. The harvester comprises a main frame member having a forward end and a trailing end. The main frame member is located on a first side of the tree or vine to be harvested during the harvesting operation. A wheel is carried on the trailing end of the main frame member. A frame hoop, which also comprises a wheel mounting location, is attached to the main frame member. The frame hoop extends away from the main frame member. The wheel mounting location on the frame hoop is located on a second side of the tree or vine to be harvested during the harvesting operation. An off-side wheel is carried on the wheel mounting location of the frame hoop. A double pivotable draw bar link is a pivotable carried at the forward end of the main frame member. It supports a draw bar support wheel carried on the double pivotable draw bar link. In order to allow the nonpowered harvester to be pulled through an orchard or vineyard a hitch link is associated with the double pivotable draw bar link. The vibratory component of the harvester includes a vibratory shaker supported on the main frame member. The crop that has been shaken from the tree or vines is transported on a crop transporting system supported from the main frame member.

The invention also includes the method of harvesting a row crop using a vibratory shaker comprising the acts of pulling an over-the-row harvester having a vibratory brush mounted thereon along the row crop and collecting the crop from both sides of the row of crop as the harvester is pulled along the row crop.

Various features, subcombinations and combinations of this invention can be practiced with or without reference to other features, subcombinations and combinations of the invention, and numerous adaptations and modifications can be effected within the spirit of the invention. While particular embodiments of the invention have been shown and described, it will be obvious to those skilled in the art that changes and modifications may be made without departing from the invention in its broader aspects, and, therefore, the aim in the appended claims is to cover all such changes and modifications as fall within the spirit and scope of the invention and the following claims. For instance, the structure of the frame hoops can be changed to be rectangular or peaked in vertical elevation rather than arcuate in the elevation view. Also, the latching means for holding the double pivotable draw bar link in the harvesting position or in the transport position can be any of a number of design alternatives such as a pin through aligned holes, a hydraulic cylinder locked in a particular displacement, or an over center linkage that can hold the draw bar link in position. Such design nuances are contemplated as being within the scope of the invention and intend to be covered by these claims.

Thus the present invention has been described in connection with certain preferred embodiments. These preferred embodiments are exemplary of certain modes of practicing the invention. A person skilled in the art will realize many alternatives to specific examples of equipment described herein.

What is claimed is:

1. An over the row single side harvester for harvesting crop from trees and vines planted in rows, the rows having a first side and a second side, as the harvester straddles the trees or vines, the harvester comprising:
   a main frame member having a forward end and a trailing end, the main frame member located on a first side of the tree or vine to be harvested during the harvesting operation;
   a wheel carried on the trailing end of the main frame member;
   a frame hoop, comprising a wheel mounting location, the frame hoop attached to the main frame member and extending away from the main frame member, the wheel mounting location of the frame hoop located on a second side of the tree or vine to be harvested during the harvesting operation;
   an off-side wheel carried on the wheel mounting location of the frame hoop;
   a double pivotable draw bar link pivotable carried at the forward end of the main frame member,
   a draw bar support wheel carried on the double pivotable draw bar link;
   clevis-like support for supporting the drawbar support wheel to the pivotable draw bar link;
   a hitch link associated with the double pivotable draw bar link;
   a vibratory shaker supported on the main frame member;
   a crop transporting system supported from the main frame member.

2. The invention in accordance with claim 1 wherein the double pivotable draw bar link further comprises a retention system for retaining the draw bar link in a fixed position.

3. The invention in accordance with claim 1 wherein the fixed position of the double pivotable draw bar link comprises fixing the draw bar link in a transport mode deployment.

4. The invention in accordance with claim 1 wherein the fixed position of the double pivotable draw bar link comprises fixing the draw bar link in a harvesting mode deployment.

5. The invention in accordance with claim 1 wherein the vibratory shaker carried on the main frame member is pivotable from a first position to an inboard position.

6. The invention in accordance with claim 4 wherein the transporting system comprises:
   crop transporting system having an outboard side and an inboard side; and
   a conveyor system for receiving crop from the crop transporting system.

7. The invention in accordance with claim 5 wherein the outboard side crop transporting system is located to accept crop from the second side of the trees or vines.

8. The invention in accordance with claim 5 wherein the inboard side crop transporting system is located to accept crop from the first side of the trees or vines.

9. The invention in accordance with claim 5 wherein the conveyor system is located to accept crop from the first side of the trees or vines and the inboard and outboard crop transmitting system.

10. The invention in accordance with claim 8 wherein a second frame hoop is attached at one end thereof to the main frame member and the second end of the second frame member extends away from the main frame member, whereby the second end of the frame hoop is located on a second side of the tree or vine to be harvested during the harvesting operation.

11. A method of harvesting crop from a row crop, the row having a first side and an "off-side," using a vibratory shaker, comprising a vibratory shaker brush having vibratory tines, the vibratory shaker brush carried by a frame having a main frame rail having a forward end, the main frame rail configured to be adjacent the first side of the row crop during harvesting, and a double pivotable draw bar link pivotally attached to the forward end of the main frame member, the method of harvesting comprising the acts of:
   moving an over-the-row single sided harvester along the row crop;
   contacting the first side of the row crop with the vibratory shaker brush;
   collecting the crop from the first side and from the "off-side" of the row as the harvester is moved along the row crop;
   further comprising positioning the double pivotable draw bar link for harvesting or for transport by the acts of:
   rotating the draw bar link around the pivotable attachment point at the front of the main frame member to a position where the draw bar link is out board of the main frame member and away from the row of crop being harvested to prepare the harvester for harvesting the row of crop;
   rotating the draw bar link around the pivotable attachment point at the front of the main frame member to a position where the draw bar link is inboard of the main frame member when the harvester is in a transport mode.

12. The method of claim 11 comprising the acts of:
   providing a hoop frame, the hoop frame having a height sufficient to pass over a crop row and a width sufficient to straddle the crop row;
   attaching the hoop frame, having a first end and a second end, to the main frame member at a first end of the hoop frame;
   attaching a wheel to the second end of the hoop frame.

13. The method of claim 12 further comprising the acts of:
   raising the wheel attached to the second end of the hoop frame, and
   lowering the wheel attached to the second end of the hoop frame, wherein the level of the harvester is effected by raising or lowering the wheel attached to the second end of the hoop frame.

14. A method of harvesting crop from a row, the row having a first side and an "off-side," using an over-the-row single sided harvester comprising a vibratory shaker with a vibratory shaker brush having vibratory tines, the vibratory shaker carried by a main frame member having a forward end, a double pivotable draw bar link pivotally attached to the forward end of the main frame member, the main frame member for supporting the vibratory shaker brush adjacent the first side of the row of crop as the harvester is moved along the row, the method comprising the acts of:

positioning the double pivotable draw bar link for harvesting or for transporting by the acts of:

rotating the draw bar link around the pivotable attachment point at the front of the main frame member to a position where the draw bar link is outboard of the main frame member and away from the row of crop being harvested to prepare the harvester for harvesting the row of crop;

rotating the draw bar link around the pivotable attachment point at the front of the main frame member to a position where the draw bar link is inboard of the main frame member when the harvester is in a transport mode;

moving the over-the-row single sided harvester along the row of crop;

contacting the first side of the row of crop with the vibratory shaker;

collecting the crop from the first side and from the "off-side" of the row of crop as the harvester is moved along the row of crop.

15. The method of claim 14 comprising the acts of:

providing a hoop frame, the hoop frame having a height sufficient to pass over a crop row and a width sufficient to straddle the crop row;

attaching the hoop frame, having a first end and a second end, to the main frame member at a first end of the hoop frame;

attaching a wheel to the second end of the hoop frame.

16. The method of claim 15 further comprising the acts of:

raising the wheel attached to the second end of the hoop frame, and lowering the wheel attached to the second end of the hoop frame, wherein the level of the harvester is effected by raising or lowering the wheel attached to the second end of the hoop frame.

* * * * *